(12) United States Patent
Werth et al.

(10) Patent No.: US 11,926,639 B2
(45) Date of Patent: Mar. 12, 2024

(54) PROCESS FOR PREPARING OLIGO ETHYLENE GLYCOL METHYL ETHER BORATE

(71) Applicant: BASF SE, Ludwigshafen (DE)

(72) Inventors: Kathrin Luise Mariethres Werth, Duesseldorf (DE); Thomas Holtmann, Ludwigshafen am Rhein (DE); Rainer Papp, Ludwigshafen am Rhein (DE); Mirko Haider, Ludwigshafen am Rhein (DE); Joachim Wulff-Doering, Ludwigshafen am Rhein (DE)

(73) Assignee: BASF SE, Ludwigshafen am Rhein (DE)

( * ) Notice: Subject to any disclaimer, the term of this patent is extended or adjusted under 35 U.S.C. 154(b) by 106 days.

(21) Appl. No.: 17/756,443

(22) PCT Filed: Nov. 19, 2020

(86) PCT No.: PCT/EP2020/082655
§ 371 (c)(1),
(2) Date: May 25, 2022

(87) PCT Pub. No.: WO2021/104982
PCT Pub. Date: Jun. 3, 2021

(65) Prior Publication Data
US 2023/0002421 A1 Jan. 5, 2023

(30) Foreign Application Priority Data
Nov. 29, 2019 (EP) ..................................... 19212588

(51) Int. Cl.
*C07F 5/04* (2006.01)
(52) U.S. Cl.
CPC ..................................... *C07F 5/04* (2013.01)

(58) Field of Classification Search
None
See application file for complete search history.

(56) References Cited

FOREIGN PATENT DOCUMENTS

| | | |
|---|---|---|
| CN | 104447829 B | 11/2016 |
| EP | 1661901 A1 | 5/2006 |

OTHER PUBLICATIONS

European Search Report for EP Patent Application No. 19212588.8, dated May 12, 2020, 3 pages.
International Search Report for PCT Patent Application No. PCT/EP2020/082655, dated Jan. 22, 2021, 3 pages.
Written Opinion for PCT Patent Application No. PCT/EP2020/082655, dated Jan. 22, 2021, 6 pages.
International Preliminary Report on Patentability for PCT Patent Application No. PCT/EP2020/082655, dated May 17, 2022, 8 pages.

*Primary Examiner* — Michael Barker
(74) *Attorney, Agent, or Firm* — Grüneberg and Myers PLLC

(57) ABSTRACT

A process for preparing oligo ethylene glycol methyl ether borate involves feeding boric acid and oligo ethylene glycol monomethyl ether into a reactor, and reacting to obtain a raw product containing oligo ethylene glycol methyl ether borate, water, and unreacted boric acid and oligo ethylene glycol monomethyl ether. The raw product is fed to a reactive distillation device and boric acid is reacted with oligo ethylene glycmonomethyl ether for full conversion of boric acid. A distillate stream containing water is transferred from the top of the reactive distillation device to a condenser, and a condensed liquid stream is recycled to the top of the reactive distillation device. A bottom product stream containing oligo ethylene glycol methyl ether borate is withdrawn from the reactive distillation device. The bottom product stream is partially recycled to a reboiler. The resulting vapor stream is recycled to the bottom of the reactive distillation device.

20 Claims, 1 Drawing Sheet

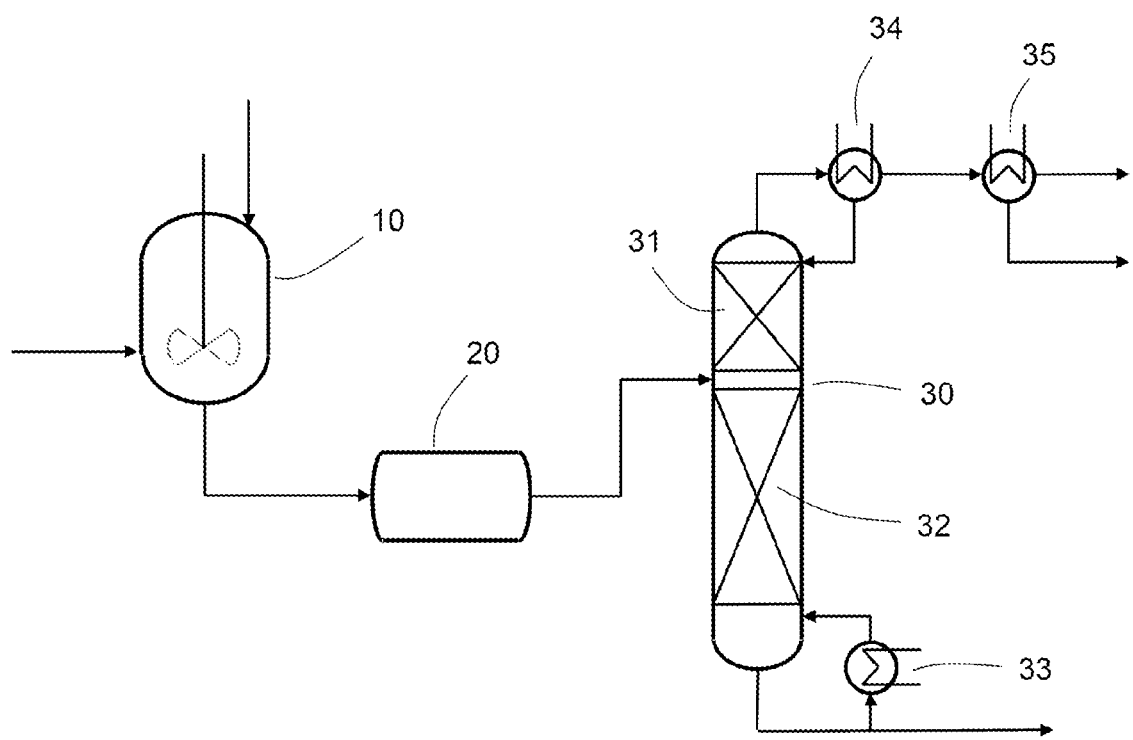

PROCESS FOR PREPARING OLIGO ETHYLENE GLYCOL METHYL ETHER BORATE

TITLE OF THE INVENTION

CROSS-REFERENCE TO RELATED APPLICATIONS

This application is the National Stage entry under § 371 of International Application No. PCT/EP2020/082655, filed on Nov. 19, 2020, and which claims the benefit of priority to European Application No. 19212588.8, filed on Nov. 29, 2019. The content of each of these applications is hereby incorporated by reference in its entirety.

BACKGROUND OF THE INVENTION

Field of the Invention

The present invention relates to a process for preparing oligo ethylene glycol methyl ether borate by reacting boric acid and oligo ethylene glycol monomethyl ether in a reactive distillation device.

DESCRIPTION OF RELATED ARTB

Due to its excellent performance, triethylene glycol methyl ether borate is a main component of break fluids, which are characterized by very good thermal stability and low viscosity. The borate is produced in an esterification reaction of boric acid with glycol ether. In general, the reaction mixture comprises the product triethylene glycol methyl ether borate, the byproduct water, the reactant triethylene glycol monomethyl ether, and also heavy-boiling components and metallic impurities. In conventional production processes this reaction mixture is separated by distillation, using either a sequence of distillation columns or a single distillation column with multiple side draws.

The document CN 104447829 A discloses a process for the preparation of triethylene glycol methyl ether borate in a single distillation column. The desired product is recovered via a side draw from the stripping section of the column. With this column design very pure triethylene glycol methyl ether borate can be produced since impurities and heavy component are separated as bottom product. The triethylene glycol monomethyl ether is withdrawn from a side draw in the rectifying section, while water is obtained as distillate. However, to achieve the required product specifications a large number of theoretical stages is needed in the distillation column. Furthermore, a high reflux ratio is needed resulting in a high energy demand of the process. The energy demand is further increased due to the evaporation of not only the not converted triethylene glycol monomethyl ether, but also the total borate product stream. To counter the high energy demand, the process is heat-integrated at several stages. The recovered triethylene glycol monomethyl ether is used to preheat the reaction mixture. Furthermore, the reaction mixture is preheated by the withdrawn triethylene glycol methyl ether borate. Subsequently, the triethylene glycol methyl ether borate is cooled down by the condensed water recovered at the column top. Even though the borate can be obtained in high purity, this process is characterized by a high energy demand, high capital costs, a complex process behavior due to heat integrations requiring a challenging process control strategy.

The document EP 1 661 901 A1 discloses a process for producing boric acid esters from boric acid or boron trioxide by reaction with alcohols in a reactive distillation column wherein the distillation is at least partially superimposed by extraction inside the column. Specific alcohols disclosed are methanol, ethanol and propanol. The respective borates as products of this process form a light-boiling azeotrope with the alcohol which necessitates the design of the reactive distillation column with superimposed extraction and an extraction agent as a further substance. The borates are withdrawn from the top of the column, the extraction agent from the bottom of the column.

SUMMARY OF THE INVENTION

It was an object of the invention to provide a process for the preparation of highly pure oligo ethylene glycol methyl ether borates that is characterized by a low overall energy demand, low capital costs and a smooth operational range.

This object is achieved according to the invention by a process for preparing oligo ethylene glycol methyl ether borates as described below. Advantageous embodiments and further developments of the process are presented further below.

A first subject of the invention is a process for preparing oligo ethylene glycol methyl ether borate comprises the following steps:
a) feeding boric acid and oligo ethylene glycol monomethyl ether into a reactor and reacting the resulting mixture to obtain a raw product which comprises oligo ethylene glycol methyl ether borate, water and unreacted boric acid and oligo ethylene glycol monomethyl ether;
b) feeding the raw product to a reactive distillation device and reacting boric acid with oligo ethylene glycol monomethyl ether to full conversion of boric acid;
c) transferring a distillate stream containing water from the top of the reactive distillation device to a condenser and recycling a condensed liquid stream to the top of the reactive distillation device; and
d) withdrawing a bottom product stream containing oligo ethylene glycol methyl ether borate from the reactive distillation device, transferring part of the bottom product stream to a reboiler and recycling the resulting vapor stream to the bottom section of the reactive distillation device.

BRIEF DESCRIPTION OF THE DRAWING

The Figure shows a process flow sheet for preparing triethylene glycol methyl ether borate as a first embodiment according to the invention.

DETAILED DESCRIPTION OF THE INVENTION

Within the scope of the invention the term "oligo" means "di", "tri" and "tetra". Thus, oligo ethylene glycol monomethyl ether may be diethylene glycol monomethyl ether, triethylene glycol monomethyl ether or tetraethylene glycol monomethyl ether. Correspondingly, oligo ethylene glycol methyl ether borate, hereinafter also referred to as "borate", may be diethylene glycol methyl ether borate, triethylene glycol methyl ether borate or tetraethylene glycol methyl ether borate.

In a first embodiment of the first subject of the invention, the oligo ethylene glycol monomethyl ether is diethylene glycol monomethyl ether and the oligo ethylene glycol methyl ether borate is diethylene glycol methyl ether borate. The process for preparing diethylene glycol methyl ether borate comprises the following steps:

a) feeding boric acid and diethylene glycol monomethyl ether into a reactor and reacting the resulting mixture to obtain a raw product which comprises diethylene glycol methyl ether borate, water and unreacted boric acid and diethylene glycol monomethyl ether;

b) feeding the raw product to a reactive distillation device and reacting boric acid with diethylene glycol monomethyl ether to full conversion of boric acid;

c) transferring a distillate stream containing water from the top of the reactive distillation device to a condenser and recycling a condensed liquid stream to the top of the reactive distillation device; and d) withdrawing a bottom product stream containing diethylene glycol methyl ether borate from the reactive distillation device, transferring part of the bottom product stream to a reboiler and recycling the resulting vapor stream to the bottom section of the reactive distillation device.

In a second embodiment of the first subject of the invention, the oligo ethylene glycol monomethyl ether is triethylene glycol monomethyl ether and the oligo ethylene glycol methyl ether borate is triethylene glycol methyl ether borate. The process for preparing triethylene glycol methyl ether borate comprises the following steps:

a) feeding boric acid and triethylene glycol monomethyl ether into a reactor and reacting the resulting mixture to obtain a raw product which comprises triethylene glycol methyl ether borate, water and unreacted boric acid and triethylene glycol monomethyl ether;

b) feeding the raw product to a reactive distillation device and reacting boric acid with triethylene glycol monomethyl ether to full conversion of boric acid;

c) transferring a distillate stream containing water from the top of the reactive distillation device to a condenser and recycling a condensed liquid stream to the top of the reactive distillation device; and d) withdrawing a bottom product stream containing triethylene glycol methyl ether borate from the reactive distillation device, transferring part of the bottom product stream to a reboiler and recycling the resulting vapor stream to the bottom section of the reactive distillation device.

In a third embodiment of the first subject of the invention, the oligo ethylene glycol monomethyl ether is tetraethylene glycol monomethyl ether and the oligo ethylene glycol methyl ether borate is tetraethylene glycol methyl ether borate. The process for preparing tetraethylene glycol methyl ether borate comprises the following steps:

a) feeding boric acid and tetraethylene glycol monomethyl ether into a reactor and reacting the resulting mixture to obtain a raw product which comprises tetraethylene glycol methyl ether borate, water and unreacted boric acid and tetraethylene glycol monomethyl ether;

b) feeding the raw product to a reactive distillation device and reacting boric acid with tetraethylene glycol monomethyl ether to full conversion of boric acid;

c) transferring a distillate stream containing water from the top of the reactive distillation device to a condenser and recycling a condensed liquid stream to the top of the reactive distillation device; and d) withdrawing a bottom product stream containing tetraethylene glycol methyl ether borate from the reactive distillation device, transferring part of the bottom product stream to a reboiler and recycling the resulting vapor stream to the bottom section of the reactive distillation device.

In step (a) the reactants boric acid and oligo ethylene glycol monomethyl ether are fed into a reactor. Preferably, the solid boric acid is completely dissolved in and thoroughly mixed with the liquid oligo ethylene glycol monomethyl ether. The mixing and dissolving can be performed entirely in the reactor, for example by providing respective mixing devices like stirrers. The mixing and dissolving can also be performed partly or entirely in devices other than the reactor, for example pre-mixers like mixing pumps.

In an esterification reaction the target product oligo ethylene glycol methyl ether borate is formed. Water is formed as a byproduct. The esterification reaction is equilibrium limited which means that in a conventional process a significant excess of boric acid would be required to shift the equilibrium towards the desired borate. However, according to the invention, only part of the reaction is performed in the reactor in step (a) whereas the remaining part of the reaction to full conversion of boric acid is performed in the reactive distillation device in step (b). Thus, the process according to the invention gives a degree of freedom with respect to the reaction regimes in the reactor and in the reactive distillation device.

In a preferred embodiment the reaction inside the reactor is performed to equilibrium conditions that result from the molar ratio of the reactants fed to the reactor.

In a preferred embodiment of the process according to the invention a low excess of alcohol is provided in the reactor. The molar ratio of oligo ethylene glycol monomethyl ether to boric acid fed to the reactor in step (a) is preferably from 3.01:1 to 3.4:1, more preferably from 3.25:1 to 3.35:1. One advantage of the excess of alcohol is a shift of the chemical equilibrium towards the desired borate which can be used to produce more borate in the reactor and thus in the feed to the reactive distillation device. A further advantage is that an excess of alcohol leads to a reduction of the bottom temperature of the reactive distillation column as the alcohol has a lower boiling point than the borate product and the unreacted alcohol is contained in the bottom product stream.

The temperature in the reactor is preferably from 60° C. to 90° C., more preferably from 75° C. to 85° C. The reactor can be equipped with a heating jacket, internal coils, or a heat exchanger in an external loop for example to keep the temperature in the desired range.

The esterification reaction inside the reactor is preferably performed at ambient pressure or slightly elevated pressure. The pressure in the reactor is preferably from 1.0 bar (abs) to 2.0 bar (abs), preferably from 1.1 bar (abs) to 1.3 bar (abs).

It is further preferred that the residence time of the mixture in the reactor is from 2 hours to 5 hours.

Preferably, the above-mentioned parameters for the esterification reaction inside the reactor are chosen such that the conversion of boric acid in the reactor is from 30% to 90%. Depending on the oligo ethylene glycol monomethyl ether present in the reactor, the preferred range of conversion leads to a preferred range of the water content of the raw product at the end of the residence time.

In case that the oligo ethylene glycol monomethyl ether is diethylene glycol monomethyl ether and the oligo ethylene glycol methyl ether borate is diethylene glycol methyl ether borate, a water content of the raw product at the end of the residence time from 3.5 wt.-% to 11.5 wt.-% is preferred.

In case that the oligo ethylene glycol monomethyl ether is triethylene glycol monomethyl ether and the oligo ethylene glycol methyl ether borate is triethylene glycol methyl ether borate, a water content of the raw product at the end of the residence time from 2.6 wt.-% to 8.8 wt.-% is preferred.

In case that the oligo ethylene glycol monomethyl ether is tetraethylene glycol monomethyl ether and the oligo ethylene glycol methyl ether borate is tetraethylene glycol methyl ether borate, a water content of the raw product at the end of the residence time from 2.1 wt.-% to 7.1 wt.-% is preferred.

After completion of the reaction in the reactor in step (a) the raw product is fed to a reactive distillation device, thereby reacting boric acid with oligo ethylene glycol monomethyl ether to full conversion of boric acid. The content of the reactor can be fed directly to the reactive distillation device. Preferably, the content of the reactor is discharged to a buffer tank and the reactive distillation device is fed from the buffer tank. In that case the reactor is available for further use immediately after the production of the raw product. The separation and purification of the raw product and a new reaction to form a further raw product batch can be performed simultaneously which saves time.

In a preferred embodiment of the process according to the invention the reaction in step (a) is performed discontinuously while steps (b) to (d) are performed continuously with a feed stream of the raw product produced in step (a). More preferably, the reaction in step (a) is performed discontinuously, the resulting raw product is buffered in a tank and steps (b) to (d) are performed continuously with a feed stream of the raw product taken from the tank.

According to the invention the reactive distillation device comprises at least one condenser and one reboiler and the configuration allows transferring a distillate stream containing water from the top of the reactive distillation device to a condenser and recycling a condensed liquid stream to the top of the reactive distillation device, withdrawing a bottom product stream containing oligo ethylene glycol methyl ether borate from the reactive distillation device, transferring part of the bottom product stream to a reboiler and recycling the resulting vapor stream to the bottom section of the reactive distillation device.

In the reactive distillation device unreacted boric acid reacts with unreacted oligo ethylene glycol monomethyl ether forming the desired borate product and water as a byproduct. Due to the combined reaction and distillation the byproduct water is continuously removed from the reacting mixture. This enables a shift of the reaction equilibrium towards the desired borate product and a full conversion of the reactant boric acid. The water is obtained at the top of the reactive distillation device whereas the borate product is obtained at its bottom.

The reactive distillation device is equipped with internals that facilitate the mass exchange between the liquid phase and the vapor phase. The internals can be trays, random packings or structured packings for example. Preferably, structured packings are used as internals.

In a preferred embodiment the rectifying section between the feed stage and the top of the reactive distillation device is equipped with internals that correspond to one to three theoretical stages. This ensures a proper separation of ether and water.

In a further preferred embodiment the stripping section between the feed stage and the bottom of the reactive distillation device is equipped with internals that correspond to 2 to 15 theoretical stages, more preferably from 5 to 10 theoretical stages. The number of theoretical stages is preferably chosen to ensure enough residence time for full conversion of the reactant boric acid.

The ratio of the number of theoretical stages of the rectifying section to the number of theoretical stages of the stripping section of the reactive distillation device is preferably from 1:2 to 1:4, more preferably from 1:2.5 to 1:3.5. A ratio in the preferred ranges has shown to ensure both, a sufficient residence time for full conversion of the reaction in the stripping section and removal of the byproduct water in the rectifying section.

According to the invention, a distillate stream containing mainly water is transferred from the top of the reactive distillation device to a condenser (step (c)). The distillate stream is at least partly condensed, and the condensed liquid stream is recycled to the top of the reactive distillation device as a reflux stream. In a preferred embodiment of the process according to the invention the reflux ratio, i.e. the mass ratio of the recycled condensed liquid stream to the distillate stream withdrawn from the top of the reactive distillation device, is from 0.2 to 0.5 by mass. This low reflux ratio leads to a significantly reduced energy consumption compared to processes known in the art, without compromising on the quality of the desired borate product.

In a preferred variant of this embodiment the reactive distillation device comprises a further condenser. In the first condenser, hereinafter denoted as "reflux condenser", the distillate stream from the top of the reactive distillation device is partly condensed. The condensed liquid stream is rich in organic compounds and is recycled to the top of the reactive distillation device as a reflux stream. The not condensed vapor stream is rich in water and is transferred to the further condenser. In this further condenser the water rich vapor stream is at least partly condensed enabling the withdrawal of water as a liquid condensate. This two-staged condenser concept enables the minimization of alcohol (ether) losses and the minimization of the TOC (Total Organic Carbon) content of the waste water withdrawn from the process.

According to the invention, a bottom product stream containing mainly oligo ethylene glycol methyl ether borate is withdrawn from reactive distillation device (step (d)). Part of the bottom product stream is transferred to a reboiler, vaporized and recycled to the bottom section of the reactive distillation device. The bottom product may contain not converted oligo ethylene glycol monomethyl ether.

Preferably, the bottom of the reactive distillation device is designed for a minimum residence time of the bottom product, e.g. by minimizing the holdup of the bottom sump.

In a preferred embodiment the reactive distillation device is operated at a pressure at the top of from 10 mbar (abs) to 30 mbar (abs), more preferably from 10 mbar (abs) to 20 mbar (abs). A low pressure at the top of the reactive distillation device leads to a low temperature of the borate product stream obtained from the bottom of the reactive distillation device with the positive effect of a high quality with respect to the color of the final product.

In a further preferred embodiment the reactive distillation device is operated at a temperature at the top of from 7° C. to 25° C., more preferably from 10° C. to 15° C.

In a further preferred embodiment the reactive distillation device is operated at a temperature at the bottom of from 150° C. to 200° C. Depending on the oligo ethylene glycol methyl ether borate to be prepared, the preferred ranges are as follows:

In a process for preparing diethylene glycol methyl ether borate the reactive distillation device is preferably operated at a temperature at the bottom of from 150° C. to 180° C.

In a process for preparing triethylene glycol methyl ether borate the reactive distillation device is preferably operated at a temperature at the bottom of from 160° C. to 190° C., more preferably from 170° C. to 190° C.

In a process for preparing tetraethylene glycol methyl ether borate the reactive distillation device is preferably operated at a temperature at the bottom of from 170° C. to 200° C.

In a preferred embodiment of the process according to the invention the mass fraction of oligo ethylene glycol monomethyl ether in the bottom product stream in step (d) is from 0 wt.-% to 12 wt.-%, more preferably from 1 wt.-% to 9 wt.-%. This can be achieved by a proper choice of the molar ratio of oligo ethylene glycol monomethyl ether to boric acid fed to the reactor in step (a) and the parameters for the operation of the reactive distillation device.

In a further preferred embodiment of the process according to the invention the mass fraction of water in the bottom product stream in step (d) is below 0.05 wt.-%, preferably below 0.02 wt.-%.

This can be achieved by a proper choice of the molar ratio of oligo ethylene glycol monomethyl ether to boric acid fed to the reactor in step (a) and the parameters for the operation of the reactive distillation device.

In a further preferred embodiment of the process according to the invention the APHA color number (ASTM D1209-05(2019)) of the bottom product stream is below 50, preferably below 20. This can be achieved by a proper choice of the parameters for the operation of the reactive distillation device causing a gentle reaction and separation process that avoids high residence times of the borate at high temperatures.

The process according to the invention has several advantages compared to conventional processes known in the art which is mainly due to the splitting of the reaction into two parts by forming a raw product in a reactor and fully converting the reactant boric acid in a subsequent reactive distillation device:

The moderate process conditions minimize the thermal stress on the borate product and lead to a product with low coloring. Furthermore, the formation of high-boiling impurities is avoided which enables the withdrawal of the borate product as a bottom product.

A very low water content in the final product is achieved by an efficient continuous separation of the byproduct water in the reactive distillation device leading to a high-quality borate product.

The process is characterized by a low energy consumption due to a low reflux ratio and the withdrawal of the desired borate product as a bottom product.

Compared to conventional distillation processes, no side draws are required to minimize impurities.

The invention is explained in more detail below with reference to the drawing. The drawing is to be interpreted as in-principle presentation. They do not constitute any restriction of the invention, for example with regards to specific dimensions or design variants. In the figure:

The Figure shows a process flow sheet for preparing triethylene glycol methyl ether borate as a first embodiment according to the invention.

List of reference numerals used:
10 . . . reactor
20 . . . buffer tank
30 . . . reactive distillation device
31 . . . rectifying section
32 . . . stripping section
33 . . . reboiler
34 . . . reflux condenser
35 . . . further condenser Example 1

The Figure shows a process flow sheet for preparing triethylene glycol methyl ether borate as a first embodiment according to the invention.

Boric acid and triethylene glycol monomethyl ether were fed into a reactor 10 in a molar ratio of 3.3:1. The reactor 10 was equipped with a heating jacket that was flown through by low pressure steam as a heat exchange medium to keep the temperature of the mixture at 80° C. The reactor 10 was operated at a pressure of 1.2 bar (abs). After a residence time of 2.5 hours the reaction mixture comprised triethylene glycol methyl ether borate, 8 wt.-% of water, unreacted boric acid and unreacted triethylene glycol monomethyl ether. The conversion of boric acid in the reactor was 89%. This raw product was discharged from the reactor 10 to a buffer tank 20.

The raw product was fed continuously from the buffer tank 20 to a reactive distillation device 30 at a flow rate of 3 t/h. The reactive distillation device was equipped with structured packings. The packing bed in the rectifying section 31 was 2 m in height corresponding to 5 theoretical stages. The packing bed in the stripping section 32 was 6 m in height corresponding to 15 theoretical stages. Thus, the ratio of the number of theoretical stages of the rectifying section 31 to the number of theoretical stages of the stripping section 32 was 1:3. The raw product was fed to a feed stage between the rectifying section 31 and the stripping section 32. In the reactive distillation device 30 unreacted boric acid and triethylene glycol monomethyl ether were reacted to full conversion of boric acid.

The reactive distillation device 30 was equipped with a bottom reboiler 33, a reflux condenser 34 and a further condenser 35. A distillate stream containing water was transferred from the top of the reactive distillation device 30 to the reflux condenser 34 which was operated with chilled water as the cooling medium. A condensed liquid stream was recycled from the reflux condenser 34 to the top of the reactive distillation device 30. The not condensed vapor phase was transferred from the reflux condenser 34 to the further condenser 35 which was operated with chilled water as the cooling medium. The liquid condensate stream withdrawn from the further condenser 35 comprised nearly pure water with a TOC content of 1700 ppm. Thus, most of the triethylene glycol monomethyl ether has been condensed in the reflux condenser 34. The pressure at the top of the reactive distillation device 30 was 15 mbar (abs). The condensation temperature of the reflux condenser 34 was about 12° C. and that of the further condenser 35 was about 10° C. The pressure drop across the column packings was about 50 mbar.

A bottom product stream containing triethylene glycol methyl ether borate was withdrawn from the reactive distillation device 30. A part of the bottom product stream was transferred to the bottom reboiler 33 that was heated by water steam at a pressure of 16 bar. The resulting vapor stream was recycled to the bottom section of the reactive distillation device 30. The temperature in the sump of the reactive distillation device was 164° C. The bottom product stream comprised mainly triethylene glycol methyl ether borate. Further components were unreacted excess triethylene glycol monomethyl ether in an amount of 9 wt.-%. The analyzed water content was 0.01 wt.-%. The APHA color number was 15.

Example 2

A process for preparing diethylene glycol methyl ether borate as a second embodiment according to the invention has been simulated using a steady-state flow sheet simulation tool. The simulation results show that a process for the preparation of diethylene glycol methyl ether borate according to the invention is feasible.

The process flow sheet corresponds to that in the Figure. Boric acid and diethylene glycol monomethyl ether are fed into a reactor 10 in a molar ratio of 3.1:1. The reactor 10 is equipped with a heating jacket to keep the temperature of the mixture at 80° C. The reactants are reacted up to the chemical equilibrium forming diethylene glycol methyl ether borate as the desired product and water as a byproduct. This raw product is fed to a reactive distillation device 30.

To achieve full conversion of boric acid the reactive distillation device is equipped with eight theoretical stages, thereof two theoretical stages in the rectifying section 31 and six theoretical stages in the stripping section 32. Thus, the ratio of the number of theoretical stages of the rectifying section 31 to the number of theoretical stages of the stripping section 32 was 1:3. In practice, the theoretical stages could easily be realized as trays or packings. The pressure at the top of the reactive distillation device 30 is set to 30 mbar (abs) which leads to a temperature of the distillate stream of about 23° C.

The reactive distillation device 30 is equipped with a bottom reboiler 33, a reflux condenser 34 and a further condenser 35. A distillate stream containing water is transferred from the top of the reactive distillation device 30 to the reflux condenser 34. A condensed liquid stream containing 7 wt.-% of diethylene glycol monomethyl ether is recycled from the reflux condenser 34 to the top of the reactive distillation device 30. The not condensed vapor phase is transferred from the reflux condenser 34 to the further condenser 35. The liquid condensate stream withdrawn from the further condenser 35 comprises nearly pure water.

A bottom product stream containing diethylene glycol methyl ether borate is withdrawn from the reactive distillation device 30. A part of the bottom product stream is transferred to the bottom reboiler 33. The resulting vapor stream is recycled to the bottom section of the reactive distillation device 30. The temperature in the sump of the reactive distillation device is 150° C. The bottom product stream comprises mainly diethylene glycol methyl ether borate. Further components are unreacted excess diethylene glycol monomethyl ether. The water content is 0.01 wt.-%.

The invention claimed is:

1. A process for preparing oligo ethylene give ether borate, comprising:
    feeding boric acid and oligo ethylene glycol monomethyl ether into a reactor and reacting a resulting mixture to obtain a raw product which comprises oligo ethylene glycol methyl ether borate, water, unreacted boric acid, and unreacted oligo ethylene glycol monomethyl ether;
    (b) feeding the raw product to a reactive distillation device and reacting the unreacted boric acid with the unreacted oligo ethylene glycol monomethyl ether for full conversion of boric acid;
    (c) transferring a distillate stream containing the water from a top of the reactive distillation device to a condenser and recycling a condensed liquid stream to the top of the reactive distillation device; and
    (d) withdrawing a bottom product stream containing the oligo ethylene glycol methyl ether borate from the reactive distillation device, transferring part of the bottom product stream to a reboiler and recycling a resulting vapor stream to a bottom section of the reactive distillation device.

2. The process according to claim 1, wherein the oligo ethylene glycol monomethyl ether is triethylene glycol tnonomethyl ether, and the oligo ethylene glycol methyl ether borate is triethylene glycol methyl ether borate.

3. The process according to claim 1, wherein a molar ratio of the oligo ethylene glycol monomethyl ether to the boric acid fed to the reactor in (a) is from 3.01: 1 to 3.4: 1.

4. The process according to claim 1, wherein a temperature in the reactor is from 60° C. to 90° C., and a pressure in the reactor is from 1.0 bar (abs) to 2.0 bar (abs).

5. The process according to claim 1, wherein a residence time of the resulting mixture in the reactor in (a) is from 2 hours to 5 hours.

6. The process according to claim 1, wherein a conversion of the boric acid in the reactor is from 30% to 90%.

7. The process according to claim 1, wherein the reaction in (a) is performed discontinuously, and the raw product is buffered in a tank, and
    wherein (b) to (d) are performed continuously with a feed stream of the raw product taken from the tank.

8. The process according to claim 1, wherein a mass fraction of the oligo ethylene glycol monomethyl ether in the bottom product stream in (d) is from 0 wt.-% to 12 wt.-%.

9. The process according to claim 1, wherein a mass fraction of the water in the bottom product stream in (d) is below 0.05 wt.-%.

10. The process according to claim 1, wherein an APHA color number of the bottom product stream is below 50.

11. The process according to claim 1, wherein the reactive distillation device is operated at a pressure at the top of from 10 mbar (abs) to 30 mbar (abs) and a temperature at the bottom of from 150° C. to 200° C.

12. The process according to claim 1, wherein the a reflux ratio of the condensed liquid stream to the distillate stream withdrawn from the top of the reactive distillation device is from 0.2 to 0.5 by mass.

13. The process according to claim 1, wherein a ratio of number of theoretical stages of a rectifying section to a number of theoretical stages of a stripping section of the reactive distillation device is from 1:2 to 1:4.

14. The process according to claim 1, wherein a nutlether of theoretical stages of a stripping section of the reactive distillation device is from 2 to 15.

15. The process according to claim 1, wherein in (c) a stream of not condensed vapor is transferred from the condenser to a further condenser in which water is withdrawn as liquid condensate.

16. The process according to claim 3, wherein the molar ratio of the oligo ethylene glycol mon.omethyl ether to the boric acid fed to the reactor in (a) is from 3.25:1 to 3.35.1.

17. The process according to claim 4, wherein the temperature in the reactor is from 75° C. to 85° C., and the pressure in the reactor is from 1.1 bar (abs) to 1.3 bar (abs).

18. The process according to claim 1, wherein the bottom product stream in (d) comprises a mass fraction of the oligo ethylene glycol monomethyl ether from 1 wt.-% to 9 wt.-%, and a mass fraction of the water below 0.02 wt.-%.

19. The process according to claim 13, wherein the ratio of the number of theoretical stages of the rectifying section to the number of theoretical stages of the stripping section of the reactive distillation device is front 1:2.5 to 1:3.5.

20. The process according to claim 14, wherein the number of theoretical stages of the stripping section of the reactive distillation device is from 5 to 10.

\* \* \* \* \*